Feb. 7, 1961 W. T. JOHNSON ET AL 2,970,343
APPARATUS FOR MAKING WOUND PLASTICS STRUCTURE
Filed Dec. 18, 1957 3 Sheets-Sheet 1
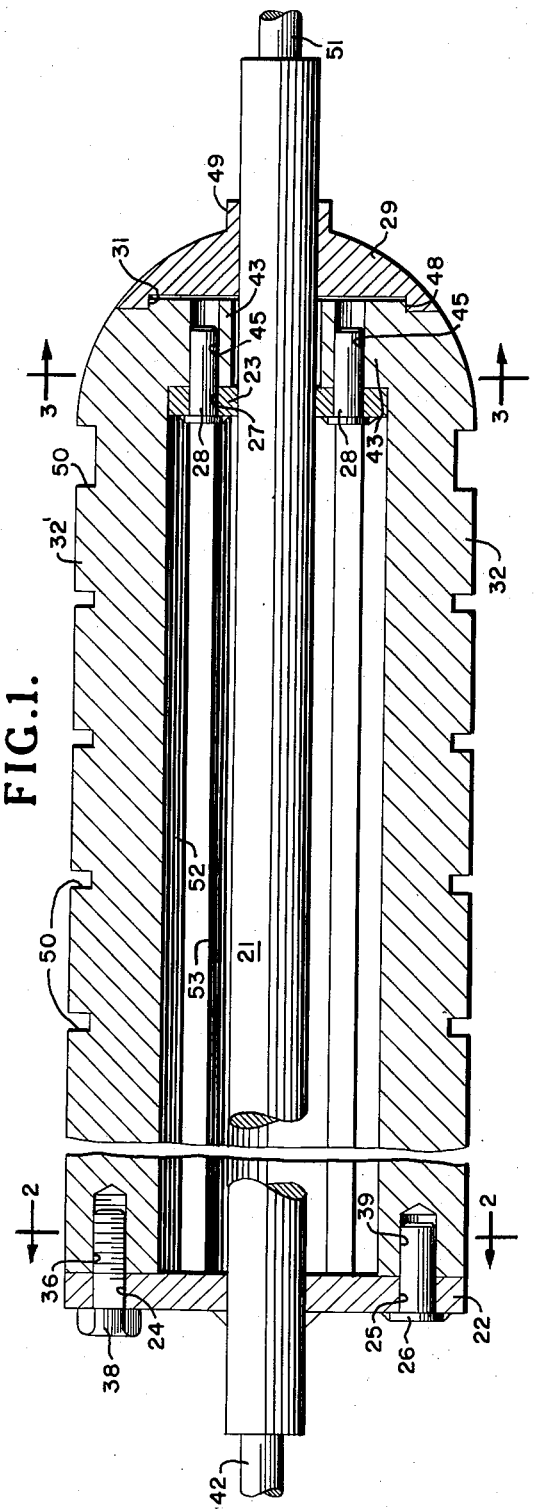
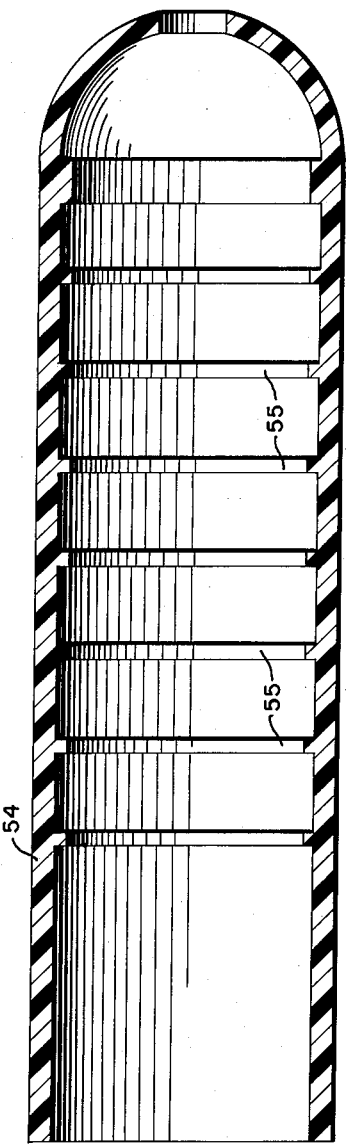
INVENTORS.
WALTER T. JOHNSON
FREDRICK R. BARNET
BY
ATTYS.

Feb. 7, 1961  W. T. JOHNSON ET AL  2,970,343
APPARATUS FOR MAKING WOUND PLASTICS STRUCTURE
Filed Dec. 18, 1957  3 Sheets-Sheet 2

INVENTORS.
WALTER T. JOHNSON
FREDRICK R. BARNET

BY
ATTYS.

Feb. 7, 1961 W. T. JOHNSON ET AL 2,970,343
APPARATUS FOR MAKING WOUND PLASTICS STRUCTURE
Filed Dec. 18, 1957 3 Sheets-Sheet 3
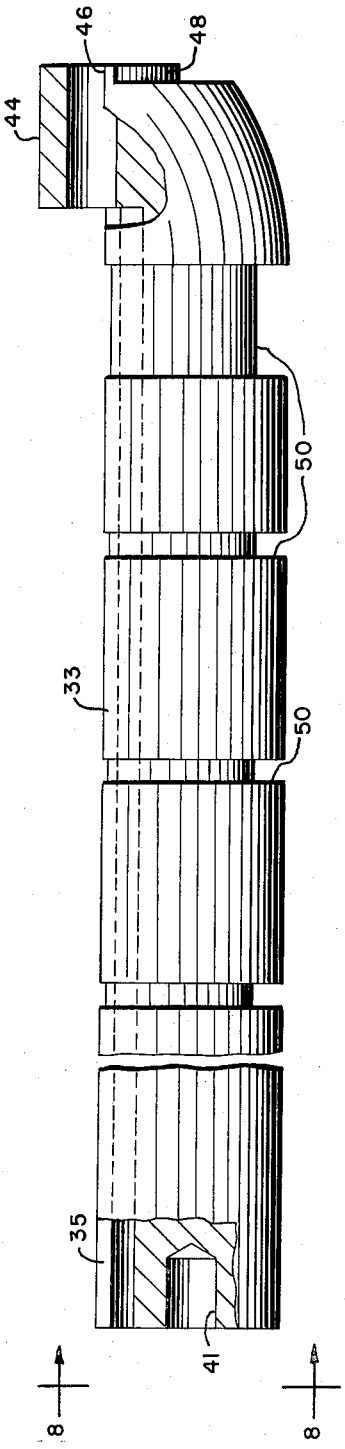
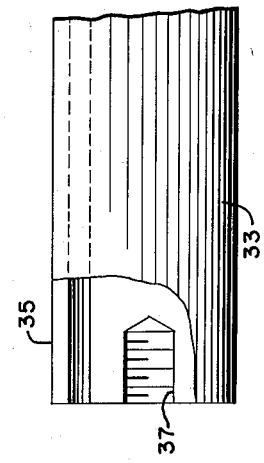
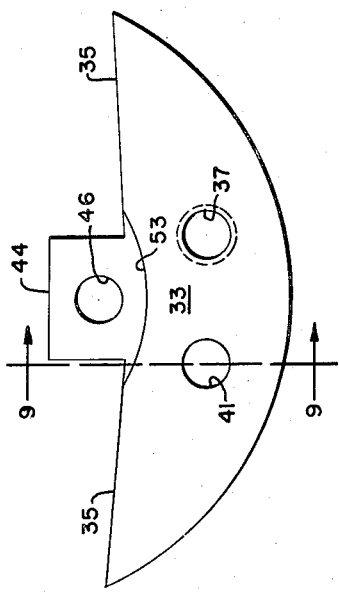
INVENTORS.
WALTER T. JOHNSON
FREDRICK R. BARNET
ATTYS.

United States Patent Office 2,970,343
Patented Feb. 7, 1961

2,970,343
APPARATUS FOR MAKING WOUND PLASTICS STRUCTURE

Walter T. Johnson and Fredrick R. Barnet, Kensington, Md., assignors to the United States of America as represented by the Secretary of the Navy Filed Dec. 18, 1957, Ser. No. 703,716

5 Claims. (Cl. 18—45)

(Granted under Title 35, U.S. Code (1952), sec. 266)

The invention described herein may be manufactured and used by or for the Government of the United States of America for governmental purposes without payment of any royalties thereon or therefor.

This invention deals with molded plastics structures, more particularly, it relates to a novel plastics structure that is reinforced in a novel manner, and apparatus for fabricating said structure.

As used in this specification the word "wound plastics" is intended to designate a structure wherein an uncured thermoplastic or thermosetting resin forms a matrix which is reinforced by winding a textile, metal or glass fiber therein and then curing the resin.

Although this invention is peculiarly suited for use in the manufacture of containers or casing, it may also be utilized for the manufacture of various other structures such as conduits of the type commonly known as "fibre glass" pipe and having interior protuberances or odd interior cross-sections.

In brief, one embodiment of the invention described herein, is directed to a wound plastic structure which is reinforced by a plurality of ribs integral with the structure. The mandrel upon which the structure is wound, is constructed in a novel manner to make possible the fabrication of precisely shaped interior projections integral wtih the remainder of the structure. The mandrel comprises a plurality of abutting longitudinal segments which may be collapsed after the plastics structure is formed and withdrawn therefrom.

Prior to this invention it has been the practice to manufacture wound plastics structures on a cylindrical mandrel, withdraw the mandrel and adhere a plurality of reinforcing members in place within the structure. The reinforcing members must be machined to close tolerances so that they fit properly within the wound plastics structure. Furthermore, the reinforcing members must be positioned accurately and the strength of the bond between the reinforcing member and the remainder of the structure is uncertain and unreliable.

The prior art method has the additional disadvantage that only circular cylindrical or conical structures can conveniently be made by that method and it is not suitable for molding precise and intricate configurations while in the instant invention, it is possible to fabricate wound plastic casings having a variety of precise configurations.

Accordingly, it is an object of this invention to provide a novel mandrel for winding plastics structures having a variety of interior cross-sectional configurations.

Another object is to provide apparatus for precision, high pressure molding of plastics materials having a variety of interior or exterior configurations.

Another object of this invention is the provision of a novel mandrel which is collapsible and on which it is possible to wind a plastics structure having a variety of interior projections.

Still another object of this invention is the provision of a wound plastics structure having a plurality of reinforcing members integral therewith.

These and many other objects of this invention will become apparent when the following description is read in conjunction with the attendant drawings wherein like numerals designate like parts throughout and in which:

Fig. 1 is a longitudinal section of a mandrel embodying the principles of this invention taken along a line through a pin 26 and a bolt 38;

Fig. 7 is a horizontal section partly broken away of one of the second pair of mandrel segments;

Fig. 8 is a section taken along line 8—8 of Fig. 7;

Fig. 9 is a section taken along line 9—9 of Fig. 8 and viewed in the direction of the arrows; and Fig. 10 is a longitudinal section of a finished casing embodying the principles of this invention.

Figure 2:
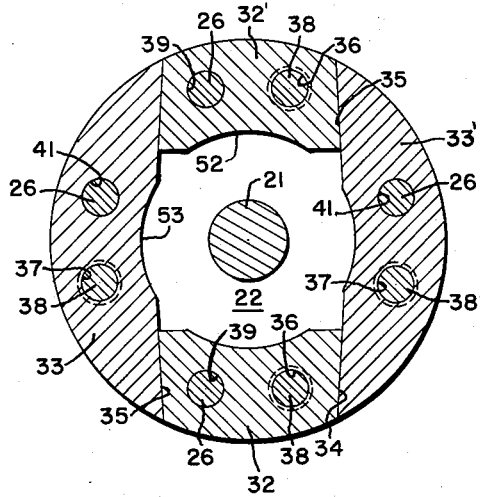
Fig. 2 is a longitudinal section taken along line 2—2 of Fig. 1 and viewed in the direction of the arrows.
Figure 3:
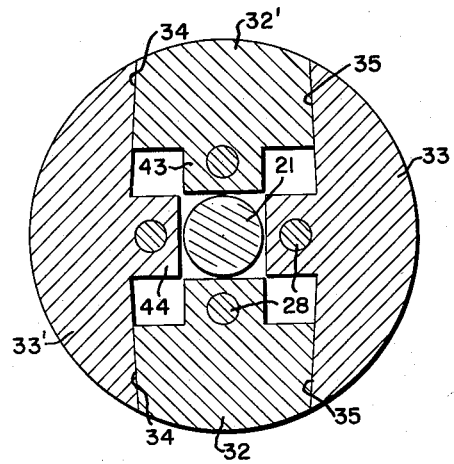
Fig. 3 is a section taken along line 3—3 of Fig. 1 and viewed in the direction of the arrows.
Figure 4:
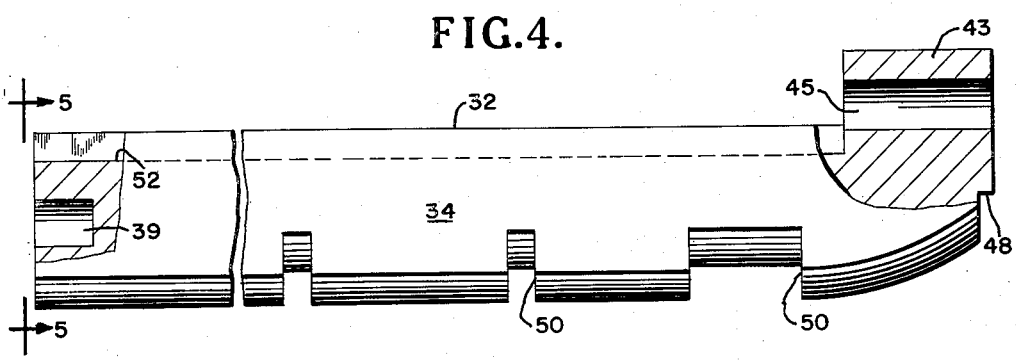
Fig. 4 is a horizontal elevation partly broken away of one of the first pair of mandrel segments.
Figure 5:
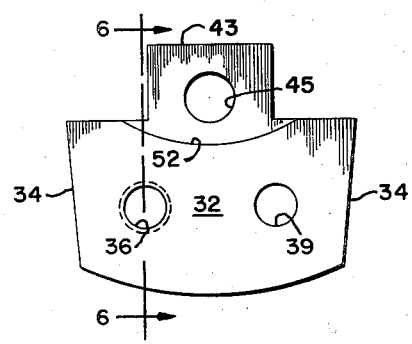
Fig. 5 is a section taken along line 5—5 of Fig. 4 and viewed in the direction of the arrows.
Figure 6:
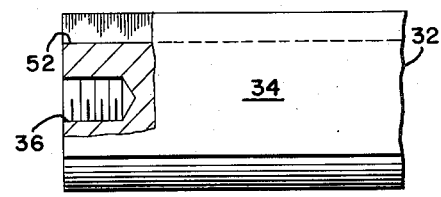
Fig. 6 is a section taken along line 6—6 of Fig. 5 and viewed in the direction of the arrows.

Referring now with greater particularity to the drawings; a longitudinal mandrel shaft 21 is rigidly secured to a plate 22 near one end and to a smaller plate 23 near its opopsite end. Plate 22 has a plurality of threaded holes 24 therethrough and a plurality of unthreaded holes 25. In each hole 25 is fixed an aligning pin 26. A plurality of holes 27 each of which is adapted to receive aligning pin 28 are formed in plate 23.

A head or cap member 29 is slideably disposed about the shaft 21 near that portion secured to plate 23. This cap has an internal shoulder 31 formed therein to aid in the positioning and restraining of the longitudinal segments 32, 32', 33, 33' as described more fully hereinbelow.

The segments 32, 32', 33, 33' are so arranged about shaft 21 and so shaped that when the internal mating surfaces 34 on pieces 32 and 32' and 35 on pieces 33 and 33' respectively are in abutting relation, the segments define an outer plastics lay down portion of the mandrel of proper dimensions. The surfaces 34 and 35 are machined to close tolerances in order that the contour of the outer periphery be accurate. At one end of each of the segments 32 and 32' there is a threaded hole 36 while a similar hole 37 is formed in segments 33 and 33'. These holes receive machine screws 38. Each of the segments 32 and 32' also has an unthreaded hole 39 to receive aligning pins 26 which are snugly fitted within the holes. Holes 41 in segments 33 and 33' also receive aligning pins 26. Segments 32 and 32' are identical except that the position of holes 36 and 39 is reversed in these pieces. Similarly, segments 33 and 33' are identical except that the relative positions of holes 37 and 41 is reversed. This assures that the segments will always be assembled on shaft 21 in the same manner, that is to say, the relative positions of 32 and 32' or 33 and 33' cannot be reversed since aligning pins 26 can only fit into the appropriate holes 39 and 41 in the segments when they are assembled in the proper circumferential juxtaposition. Accordingly, the apparauts will be described with reference to only segments 32 and 33, it being understood that segments 32' and 33' are similar except for the above described difference.

At the opposite end of each of the segments 32 and 33 is an internal boss 43 and 44 formed integral with the segment pairs 32 and 33 respectively. Each boss 43 and 44 has a hole 45 and 46 respectively therethrough to receive an aligning pin 28 which is closely fitted into and welded to the plate 23. These bosses project radially interiorly of the assembled mandrel and are machined to a length so that they are always a short distance from the shaft 21.

When the mandrel is completely assembled, pins 28 fit into holes 45 and 46 which are accurately positioned so that each of the bosses is positioned so that the outer surface of each of the segments is faired into the surface of the cap 29 and the outer surface of the mandrel is in the proper position for plastics laydown. The shoulder 31 on cap 29 serves to retain a shoulder 48 on each of the segments 32 and 33 in the proper position and thereby aids in the alignment of these segments with the cap.

Each segment has a plurality of grooves or notches 50 on its outer periphery, each having a slight draft of about 4° to facilitate removal of the finished piece from the mandrel. The grooves form internal bosses or ridges in the wound plastic structure. In the event that a continuous internal reinforcing rib is to be formed in the structure, the grooves in each segment are disposed in an end-to-end relation in the assembled mandrel thereby providing a continuous groove in the outer surface thereof.

When the piece is assembled as above described, it is erady for use in a plastics winding process. The process is begun by rotating the mandrel shaft 21 and concurrently laying down resin and a reinforcing filament to fill up the grooves 50 and build up a structure on the outer surface of the assembled mandrel. An elongated collar 49 on the mandrel cap 29 prevents the resin or filaments from being accidentally deposited on shaft 21. The actual lay down process is very similar to conventional technique except that the grooves are first filled to form integral ribs in the finished piece. Accordingly, the lay down process will not be described in detail.

When the structure formed is cured and ready for removal from the mandrel, screws 38 are removed from plate 22 and segments 32 32', 33 and 33' and a sharp rap is delivered to the end 51 of shaft 21, driving the shaft and its attached plates 22 and 23 to the left as seen in Fig. 1. Pins 26 and 28 are withdrawn from aligning holes 37, 39, and 45, 46 respectively as the shaft is moved to the left. The shaft is then pulled further to the left by grasping and withdrawing its opposite end 42 until it is completely withdrawn from the mandrel. The inner surfaces of the segments 32 and 33 are machined to form a clearance groove 52 and 53 respectively to allow plate 23 to move without undue contact over the interior surfaces of these segments as it is withdrawn. The mating surfaces 34 and 35 of the segments 32 and 33 prevent the mandrel from collapsing after the shaft has been removed, due to a keystone effect between these segments. However, by delivering a sharp rap to the segments they may be collapsed and withdrawn from the plastics structure one by one. The segments are moved radially inward and then to the left and withdrawn through the open end of the wound plastic structure 54 having integral ribs 55.

It should be obvious to those skilled in the art after understanding this description that a mandrel of the type herein disclosed can be used to make any wound plastic structure having integral bosses, ribs or indentations and also may be employed in fabricating structures of odd internal cross-sections.

Although this invention has been described with reference to a reinforced plastics process, it is not limited to the particular embodiment disclosed in detail. The technique and apparatus described is also applicable in high pressure molding processes as for example compression or transfer molding. When used in high pressure molding processes the mandrel described hereinabove may form either the male (force) portion or the female (cavity) portion of the mold. This would permit the molding of a variety of complicated internal or external configurations and would result in more precise or accurate moldings than is attainable with conventional molding techniques.

Although only one preferred embodiment of this invention has been shown in detail, many variations and modifications can be made without departing from the spirit and scope thereof. Accordingly, this invention is to be limited only by the scope of the appended claims.

What is claimed as new and desired to be secured by Letters Patent of the United States is:

1. A collapsible mandrel for forming a plastics structure comprising; a shaft, a first pair of mandrel segments disposed on diametrically opposite sides of said shaft and spaced therefrom, each of said segments having a laydown surface remote from said shaft and a tapered, substantially flat surface adjacent to said shaft, a second pair of mandrel segments disposed on opposite sides of said shaft between said first pair of segments and each having a laydown surface, segment guide means carried by said shaft, means integral with each of said segments extending inwardly toward said shaft and cooperating with said guide means to support the mandrel segment pairs at a predetermined radial distance from said shaft, at which distance the mandrel segments form a hollow mandrel about the shaft and the lay down surfaces of segments are contiguous and define a shaped surface suitable for forming an open-ended plastics structure thereon, means releasably locking said shaft to an end of each of said segments, each of said second pair of segments having a pair of inwardly tapering flat surfaces each mating with one of the tapered flat surfaces of said first pair of segments, whereby the taper of the mating surfaces permits at least one of said second pair of segments to be moved radially inwardly toward said shaft to initiate collapse of said hollow mandrel to facilitate separate withdrawal of the mandrel segments through an open end of a plastics structure formed on said mandrel after the locking means is released and the shaft is withdrawn from the hollow interior of the mandrel.

2. The mandrel of claim 1 wherein each of the lay down surfaces has at least one groove formed therein, and grooves in contiguous lay down surfaces are aligned to allow the formation of at least one internally projecting plastics member integral with the plastics structure formed on the mandrel.

3. The mandrel of claim 1 wherein the end of each segment opposite to the end locked to said shaft has a shoulder thereon, said shoulders forming a composite radial shoulder on said mandrel and further comprising a cap slidably disposed about said shaft, said cap having an internal shoulder cooperating with the radial shoulder and providing a continuation of the shaped mandrel surface.

4. A collapsible mandrel for forming a wound plastics structure comprising; a shaft, a first pair of mandrel segments disposed on diametrically opposite sides of the shaft and each having a curved surface remote from the shaft and a tapered flat surface proximate to said shaft, a second pair of segments disposed on diametrically opposite sides of the shaft between said first pair of segments, said second pair of segments each having a curved surface contiguous with the curved surfaces of said first pair of segments, a substantially flat surface proximate to the shaft, and a pair of tapering surfaces extending between the curved surface and the substantially flat surface, said tapering surfaces each in slideable engagement with one of the tapered flat surfaces of said first pair of segments whereby said segments form a hollow cylindrical mandrel, a boss formed on each segment and extending toward said shaft, each boss having an aligning hole therein, a disc secured to said shaft and disposed within the hollow cylinder formed by the mandrel segments, aligning pins fixed to said shaft and each disposed within a respective aligning hole in each boss to stand off the boss slightly from the shaft and to position said segments so that the curved surfaces of the segments are contiguous, a longitudinal clearance groove formed in the flat surface of each segment proximate to the shaft to facilitate withdrawal of the shaft and disc from the mandrel, means carried by said shaft and disposed exteriorly of the mandrel for releasably locking the shaft to the mandrel, whereby said shaft may be removed from the mandrel upon release of said last named means to permit at least one of said second segments to slide radially interiorly of the mandrel to collapse the mandrel.

5. The mandrel of claim 4 wherein a plurality of grooves are formed in the outer curved surface of the mandrel to permit formation on said mandrel of a hollow plastics structure having integral interior protuberances.

References Cited in the file of this patent

UNITED STATES PATENTS

| | | |
|---|---|---|
| 662,091 | Ricke | Nov. 20, 1900 |
| 1,404,217 | Murray | Jan. 24, 1922 |
| 1,470,612 | Bronson | Oct. 16, 1923 |
| 1,573,386 | Field | Feb. 16, 1926 |
| 2,349,806 | Bean | May 30, 1944 |
| 2,460,845 | Rempel | Feb. 8, 1949 |